(12) United States Patent
Wahlroos et al.

(10) Patent No.: US 8,981,785 B2
(45) Date of Patent: Mar. 17, 2015

(54) METHOD AND APPARATUS FOR DETECTING EARTH FAULT

(75) Inventors: Ari Wahlroos, Vaasa (FI); Janne Altonen, Toijala (FI)

(73) Assignee: ABB Technology AG, Zurich (CH)

( * ) Notice: Subject to any disclaimer, the term of this patent is extended or adjusted under 35 U.S.C. 154(b) by 283 days.

(21) Appl. No.: 13/371,112

(22) Filed: Feb. 10, 2012

(65) Prior Publication Data

US 2013/0043879 A1 Feb. 21, 2013

(30) Foreign Application Priority Data

Feb. 11, 2011 (EP) .................................... 11154146

(51) Int. Cl.
| | |
|---|---|
| *G01R 31/14* | (2006.01) |
| *G01R 31/00* | (2006.01) |
| *G01R 31/08* | (2006.01) |
| *H02H 3/40* | (2006.01) |
| *H02H 1/00* | (2006.01) |

(52) U.S. Cl.
CPC ............. *H02H 3/402* (2013.01); *H02H 1/0092* (2013.01)
USPC ............ 324/509; 324/500; 324/522; 324/525

(58) Field of Classification Search
None
See application file for complete search history.

(56) References Cited

U.S. PATENT DOCUMENTS

| | | | |
|---|---|---|---|
| 4,261,038 A | | 4/1981 | Johns et al. |
| 2005/0200364 A1* | | 9/2005 | Takakamo et al. ............. 324/551 |
| 2011/0298468 A1* | | 12/2011 | Wahlroos et al. ............. 324/509 |

FOREIGN PATENT DOCUMENTS

| | | |
|---|---|---|
| CN | 101363880 A | 2/2009 |
| DE | 196 40 821 A1 | 4/1998 |
| EP | 2192416 A1 * | 6/2010 |
| EP | 1 139 539 A2 | 10/2011 |
| WO | WO 2010061055 A1 * | 6/2010 |

OTHER PUBLICATIONS

European Search Report dated May 10, 2011.
Józef Lorenc et al., "Addmittance Criteria for Earth Fault Detection in Substation Automation Systems in Polish Distribution Power Networks", CIRED 97, Birmingham, Jun. 1997, 5 pages.
Jozef Lorenc et al., Detection of the Intermittent Earth Faults in Compensated MV Network, IEEE Bologna Power Tech Conference, 2003, 6 pages.
Office Action issued on Jul. 14, 2014, by the Chinese Patent Office in corresponding Chinese Patent Application No. 201210028876.8, and an English Translation of the Office Action. (18 pages).

* cited by examiner

*Primary Examiner* — Melissa Koval
*Assistant Examiner* — Courtney McDonnough
(74) *Attorney, Agent, or Firm* — Buchanan Ingersoll & Rooney PC

(57) ABSTRACT

A method and an apparatus for detecting an earth fault on a three-phase electric line are provided. The apparatus includes means for determining a neutral admittance on the basis of a residual current and a residual voltage, means for comparing the determined neutral admittance to a predetermined operation characteristic to detect an earth fault on the three-phase electric line, and means for determining one or more harmonic components of the residual current and one or more harmonic components of the residual voltage. The harmonic components have frequencies n*fn such that n≥2 and fn is a fundamental frequency. The means for determining a neutral admittance are configured to use at least one of the determined one or more harmonic components of the residual current and at least one of the determined one or more harmonic components of the residual voltage for determining the neutral admittance.

13 Claims, 1 Drawing Sheet

METHOD AND APPARATUS FOR DETECTING EARTH FAULT

RELATED APPLICATION

This application claims priority under 35 U.S.C. §119 to European Patent Application No. 11154146.2 filed in Europe on Feb. 11, 2011, the entire content of which is hereby incorporated by reference in its entirety.

FIELD

The present disclosure relates to a method and apparatus for detecting an earth fault on a three-phase electric line of an electric network.

BACKGROUND INFORMATION

In some countries, neutral admittance protection has become a common earth fault protection function. It has been reported to provide improved effectiveness in earth fault detection when compared to the traditional residual current based earth fault protection in unearthed and compensated distribution networks. J. Lorenc et. al, Admittance Criteria For Earth Fault Detection In Substation Automation Systems in Polish Distribution Power Networks, CIRED 97, Birmingham, June 1997, discloses examples of the implementation of the neutral admittance based earth fault protection.

The admittance-based earth fault protection can be based on evaluating the quotient between fundamental frequency phasors of residual current $\bar{I}_o$ and residual voltage $\bar{U}_o$:

$$\bar{Y}_o = \bar{I}_o / -\bar{U}_o$$

Alternatively, the admittance calculation can be made by utilizing so-called delta quantities, i.e. the change in residual quantities due to the earth fault:

$$\bar{Y}_o = (\bar{I}_{o\_fault} - \bar{I}_{o\_prefault}) / -(\bar{U}_{o\_fault} - \bar{U}_{o\_prefault})$$

where "fault" denotes the time during the fault and "prefault" denotes the time before the fault.

The result can then be compared with operating boundaries on an admittance plane. The admittance protection, similar to other earth fault protection functions, can use a $U_o$ overvoltage condition as a common criterion for the initial fault detection. The setting value for $U_o$ start can be set above the maximum healthy $U_o$ level of the network in order to avoid false starts.

The admittance protection can provide many attractive features such as inherent immunity to fault resistance, generally universal applicability, good sensitivity and easy setting principles. However, in some cases, the sensitivity of the admittance protection might not be good enough.

In Jozef Lorenc et al., Detection of the Intermittent Earth Faults in Compensated MV Network, 2003 IEEE Bologna Power Tech Conference, an admittance criterion utilizing wavelets is proposed. A drawback related to this solution, however, is that it is dedicated on intermittent earth faults and as such it is not applicable to permanent earth faults.

SUMMARY

An exemplary embodiment of the present disclosure provides a method for detecting an earth fault on a three-phase electric line of an electric network. The exemplary method includes monitoring a residual current on the three-phase electric line and a residual voltage in the electric network, detecting an earth fault in the electric network, and determining a neutral admittance, or a quantity indicative thereof, on the basis of the residual current and the residual voltage. The exemplary method also includes comparing the determined neutral admittance, or the quantity indicative thereof, to a predetermined operation characteristic to detect an earth fault on the three-phase electric line, and determining one or more harmonic components of the residual current and one or more harmonic components of the residual voltage, where the harmonic components have frequencies n*fn such that n≥2 and fn is a fundamental frequency; The determining of the neutral admittance, or the quantity indicative thereof, is performed using at least one of the determined one or more harmonic components of the residual current and the at least one of the determined one or more harmonic components of the residual voltage.

An exemplary embodiment of the present disclosure provides a non-transitory computer-readable recording medium having a computer program recorded thereon that causes a processor of a computer processing device to carry out operations for detecting an earth fault on a three-phase electric line of an electric network. The operations include monitoring a residual current on the three-phase electric line and a residual voltage in the electric network, detecting an earth fault in the electric network, and determining a neutral admittance, or a quantity indicative thereof, on the basis of the residual current and the residual voltage. The operations also include comparing the determined neutral admittance, or the quantity indicative thereof, to a predetermined operation characteristic to detect an earth fault on the three-phase electric line, and determining one or more harmonic components of the residual current and one or more harmonic components of the residual voltage, where the harmonic components have frequencies n*fn such that n≥2 and fn is a fundamental frequency. The determining of the neutral admittance, or the quantity indicative thereof, is performed using at least one of the determined one or more harmonic components of the residual current and the at least one of the determined one or more harmonic components of the residual voltage.

An exemplary embodiment of the present disclosure provides an apparatus for detecting an earth fault on a three-phase electric line of an electric network. The exemplary apparatus includes means for monitoring a residual current on the three-phase electric line and a residual voltage in the electric network, means for detecting an earth fault in the electric network, and means for determining a neutral admittance, or a quantity indicative thereof, on the basis of the residual current and the residual voltage. The exemplary apparatus also includes means for comparing the determined neutral admittance, or the quantity indicative thereof, to a predetermined operation characteristic to detect an earth fault on the three-phase electric line, and means for determining one or more harmonic components of the residual current and one or more harmonic components of the residual voltage, where the harmonic components have frequencies n*fn such that n≥2 and fn is a fundamental frequency. The means for determining a neutral admittance, or a quantity indicative thereof, are configured to use at least one of the determined one or more harmonic components of the residual current and at least one of the determined one or more harmonic components of the residual voltage for the determining of the neutral admittance or the quantity indicative thereof.

An exemplary embodiment of the present disclosure provides an apparatus for detecting an earth fault on a three-phase electric line of an electric network. The exemplary apparatus includes a processor, and a memory storing instructions that, when executed by the processor, cause the apparatus to: monitor a residual current on the three-phase electric line and a residual voltage in the electric network; determine one or more harmonic components of the residual current and one or more harmonic components of the residual voltage, where the harmonic components having frequencies n*fn such that n≥2 and fn is a fundamental frequency; detect an earth fault in the electric network; determine a neutral admittance, or a quantity indicative thereof, on the basis of the residual current and the residual voltage by using at least one of the determined one or more harmonic components of the residual current and at least one of the determined one or more harmonic components of the residual voltage; and compare the determined neutral admittance, or the quantity indicative thereof, to a predetermined operation characteristic to detect an earth fault on the three-phase electric line.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

An object of the present disclosure is to provide a method and an apparatus for implementing the method so as to overcome the above problem or at least to alleviate the problem. The objects of the present disclosure are achieved by a method, a computer program recorded on a non-transitory computer-readable recording medium (e.g., a non-volatile memory) and executed by a processor of a computer processing device, and an apparatus as disclosed herein. Exemplary embodiments of the present disclosure are discussed in more detail below with reference to the drawings.

Exemplary embodiments of the present disclosure are based on the idea of using one or more harmonic components of residual current and one or more harmonic components of residual voltage in the neutral admittance determination either independently or to complement the fundamental frequency based admittance determination.

An advantage of exemplary embodiments of the present disclosure is that they can provide additional sensitivity compared with the fundamental frequency component based neutral admittance criterion when harmonics are present in the electric network.

The application of the present disclosure is not limited to any specific system, but it can be used in connection with various three-phase electric systems to detect a phase-to-earth fault on a three-phase electric line of an electric network, for example. The electric line can be a feeder, for example, and it may be an overhead line or a cable or a combination of both. The electric power system in which the present disclosure may be implemented can be an electric transmission or distribution network or a component thereof, for example, and may include several feeders or sections. Moreover, the use of the disclosure is not limited to systems employing 50 Hz or 60 Hz fundamental frequencies or to any specific voltage level.

Figure 1:
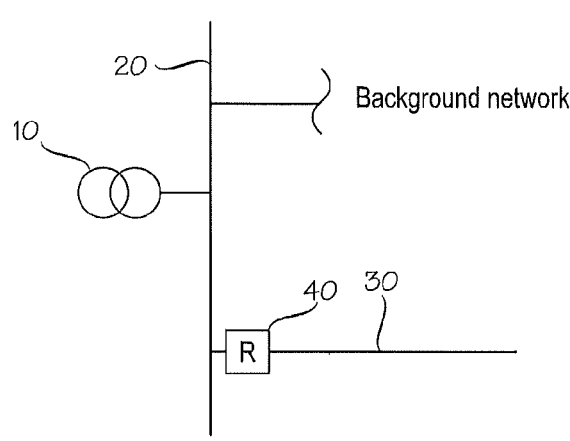
FIG. 1 is a simplified diagram illustrating an example of an electric network according to an exemplary embodiment of the present disclosure.

FIG. 1 is a simplified diagram illustrating an electric network in which exemplary embodiments of the present disclosure can be applied. FIG. 1 shows only the components necessary for understanding exemplary embodiments of the present disclosure. The exemplary network can be a medium voltage (e.g. 20 kV) distribution network fed through a substation including a transformer 10 and a busbar 20. The illustrated network also includes electric line outlets, e.g., feeders, of which one feeder 30 is shown separately. Other possible feeders as well as other network parts, except the line 30, are referred to as a 'background network'. FIG. 1 also shows a protective relay unit 40 at the beginning of the electric line 30. The protective relay unit 40 may be located inside the substation. It should be noted that there may be any number of feeders or other network elements in the electric network. There may also be several feeding substations. Further, exemplary embodiments of the present disclosure can be utilized with a switching station without a transformer 10, for example. The network is a three-phase network, although, for the sake of clarity, the phases are not shown in FIG. 1. In the exemplary system of FIG. 1, the functionality of the disclosure may be located in the relay unit 40, for example. It is also possible that, for instance, only some measurements are performed at the location of the relay unit 40 and the results are then transmitted to some other unit or units in another location for further processing. In other words, according to an exemplary embodiment, the relay unit 40 could be a mere measuring unit, while the functionality of the present disclosure, or part of it, could be located in some other unit or units.

Current and voltage values that are needed in the following exemplary embodiments may be obtained by a suitable measuring arrangement including, for example, current and voltage transducers. In most of the existing protection systems, such values are readily available and thus the implementation of the various embodiments does not necessarily require any additional measuring arrangements. The residual voltage of the electric network may be determined from phase voltages or by measuring it from an open delta winding formed by voltage transformers, for example. The residual current of the electric line 30 may be determined with a suitable current measuring arrangement at a measuring point such as the relay unit 40. How these values are obtained is of no relevance to the basic idea of the present disclosure and depends on the particular electricity system.

According to an exemplary embodiment, the residual current $I_o$ on the three-phase electric line 30 and the residual voltage $U_o$ in the electric network are monitored. Further, one or more harmonic components of the residual current $\overline{I}_o{}''$ and one or more harmonic components of the residual voltage $\overline{U}_o{}''$ are determined from the monitored residual current and residual voltage, where such harmonic components have frequencies n*fn such that n≥2 and fn is the fundamental frequency (for which n=1, normally e.g. 50 Hz or 60 Hz). The term 'harmonic component' generally refers to a component frequency of the current or voltage signal that is an integer multiple of the fundamental frequency fn of the signal. The harmonic components may be determined from n=2 up to n=((sampling frequency)/2)/fn, where the sampling frequency is the sampling frequency of the monitored current or voltage signal. The determination of the harmonic components may be performed by utilizing a Discrete Fourier Transform (DFT, FFT), for example.

Further, according to an exemplary embodiment, an earth fault is detected in the electric network. An earth fault occurring in the electric network may be detected, for example, by the protective relay 40 associated with the electric network and the detection may be based on the value of the residual voltage $U_o$ of the electric network, for example. The particular way how earth faults are detected is, however, of no relevance to the basic idea of the present disclosure.

After an earth fault has been detected in the electric network, a neutral admittance, or a quantity indicative thereof, is determined. According to an exemplary embodiment, the determining of the neutral admittance, or the quantity indicative thereof, is performed by using at least one of the determined one or more harmonic components of the residual current and at least one of the determined one or more harmonic components of the residual voltage. According to an exemplary embodiment, the at least one of the determined one or more harmonic components of the residual current and the at least one of the determined one or more harmonic components of the residual voltage used for the determining of the neutral admittance or the quantity indicative thereof are selected according to one or more predetermined criteria. Thus, only some of the determined one or more harmonic components of the residual current $\overline{I}_o^n$ and one or more harmonic components of the residual voltage $\overline{U}_o^n$ may be selected to be used in the determination of the neutral admittance. Such a selection may be performed on the basis of one or more predetermined criteria. Such predetermined criteria may be alternatives to each other or they may complement each other. Possible criteria, which can be used alone or as a combination of two or more criteria, are given in the following.

According to an exemplary embodiment, the one or more predetermined criteria can include a minimum value for the harmonic component of the residual current and the harmonic component of the residual voltage. In other words, it is possible to select such harmonic components of the residual current and the residual voltage that exceed a predetermined minimum value. Thus, it is possible to select harmonic components which have a sufficient amplitude.

According to an exemplary embodiment, the one or more predetermined criteria can include a stability requirement for the harmonic component of the residual current and/or the harmonic component of the residual voltage and/or a ratio between the harmonic component of the residual current and the harmonic component of the residual voltage, for example, the neutral admittance. In other words, it is possible to select such harmonic components that fulfil a predetermined stability requirement. The stability requirement may require that the harmonic component of the residual current and/or the harmonic component of the residual voltage and/or a ratio between the harmonic component of the residual current and the harmonic component of the residual voltage, for example, the neutral admittance, is stable during a predetermined time period, for example, that the magnitude difference and/or the phase angle difference and/or the derivative difference between consecutive samples of predetermined criteria or otherwise predefined samples of predetermined criteria is/are within a predetermined limit.

According to an exemplary embodiment, the one or more predetermined criteria can include a criterion to select one or more harmonic components of the residual current and/or harmonic components of the residual voltage which have the highest magnitude.

In the selection process described above, harmonic components of the residual current and harmonic components of the residual voltage may be selected in pairs having the same order number (e.g. n=5) to enable the determination of the neutral admittance. Thus, if the predetermined criteria only concern the harmonic components of the residual current and if, according to the selection criteria, the $n^{th}$ harmonic component of the residual current is selected, then the corresponding $n^{th}$ harmonic component of the residual voltage may also be selected. And vice versa, if the predetermined criteria only concern the harmonic components of the residual voltage and if, according to the selection criteria, the $n^{th}$ harmonic component of the residual voltage is selected, then the corresponding $n^{th}$ harmonic component of the residual current may also be selected.

According to an exemplary embodiment, corresponding neutral admittance(s) $\overline{Y}_o^n$ for the harmonic component(s) n is/are determined for the selected at least one of the determined one or more harmonic components of the residual current and the at least one of the determined one or more harmonic components of the residual voltage. It is possible to perform the determination of the neutral admittance(s) $\overline{Y}_o^n$ for the harmonic component(s) n before or after the possible selection. Thus, the neutral admittance(s) $\overline{Y}_o^n$ for the harmonic component(s) n could initially be determined even for each one of the determined one or more harmonic components of the residual current $\overline{I}_o^n$ and one or more harmonic components of the residual voltage $\overline{U}_o^n$ and then, after selecting possibly only some of the harmonic components, only the corresponding neutral admittance(s) for these harmonic component(s) n are utilized. According to an exemplary embodiment, the neutral admittance $\overline{Y}_o^n$ for the harmonic component n can be determined from the harmonic component of the residual current and the harmonic component of the residual voltage according to the following equation:

$$\overline{Y}_o^n = \frac{\overline{I}_{o\_fault}^n}{-\overline{U}_{o\_fault}^n},$$

or $$\overline{Y}_o^n = \frac{\overline{I}_{o\_d}^n}{-\overline{U}_{o\_d}^n},$$

where $$\overline{I}_{o\_d}^n = \overline{I}_{o\_fault}^n - \overline{I}_{o\_pre\text{-}fault}^n$$

$$\overline{U}_{o\_d}^n = \overline{U}_{o\_fault}^n - \overline{U}_{o\_pre\text{-}fault}^n$$

$\overline{I}_{o\_fault}^n$=the $n^{th}$ harmonic component of the residual current during the earth fault $\overline{I}_{o\_pre\text{-}fault}^n$=the $n^{th}$ harmonic component of the residual current before the earth fault $\overline{U}_{o\_fault}^n$=the $n^{th}$ harmonic component of the residual voltage during the earth fault $\overline{U}_{o\_pre\text{-}fault}^n$=the $n^{th}$ harmonic component of the residual voltage before the earth fault.

The selection between the above two alternative equations for determining the neutral admittance $\overline{Y}_o^n$ for the harmonic component n can be made by an operator of the system or it may be based on some predefined criteria.

According to an exemplary embodiment, when only one harmonic component of the residual current and one harmonic component of the residual voltage are selected, the neutral admittance $\overline{Y}_o$ is determined to be equal to the neutral admittance $\overline{Y}_o^n$ for the harmonic component n obtained from the selected harmonic component of the residual current and the selected harmonic component of the residual voltage, i.e. $\overline{Y}_o = \overline{Y}_o^n$.

According to an exemplary embodiment, when more than one harmonic component of the residual current and more than one harmonic component of the residual voltage are selected, the neutral admittance $\overline{Y}_o$ is determined to be equal to a vector sum of individual neutral admittances $\overline{Y}_o^n$ for the harmonic components n obtained from the selected harmonic components of the residual current and the selected harmonic components of the residual voltage, i.e. $\overline{Y}_o = \Sigma \overline{Y}_o^n$. For example, if harmonics of the order of n=5 and n=7 are selected, then the neutral admittance $\overline{Y}_o$ is determined to be equal to $\overline{Y}_o = \overline{Y}_o^5 + \overline{Y}_o^7$.

According to an exemplary embodiment, when one or more harmonic components of the residual current and harmonic components of the residual voltage are selected, the neutral admittance $\overline{Y}_o$ is determined to be equal to a sum of a fundamental frequency neutral admittance $\overline{Y}_o^1$ and a sum of the neutral admittance(s) $\overline{Y}_o^n$ for the harmonic component(s) n obtained from the selected one or more harmonic components of the residual current and harmonic components of the residual voltage, i.e. $\overline{Y}_o = \overline{Y}_o^1 + \Sigma \overline{Y}_o^n$. The fundamental frequency neutral admittance $\overline{Y}_o^1$ can be determined by using either of the above alternative equations for determining the neutral admittance(s) $\overline{Y}_o^n$ for the harmonic component(s) n and by setting n=1.

According to an exemplary embodiment, once the neutral admittance $\overline{Y}_o$, or a quantity indicative thereof, has been determined as described above, it is compared to a predetermined operation characteristic to detect an earth fault on the three-phase electric line 30. According to an exemplary embodiment, the predetermined operation characteristic, when presented on an admittance plane, defines an operate area and a non-operate area. According to an exemplary embodiment, the comparing of the determined neutral admittance $\overline{Y}_o$, or the quantity indicative thereof, to the predetermined operation characteristic to detect an earth fault on the three-phase electric line 30 includes determining whether the determined neutral admittance $\overline{Y}_o$, or the quantity indicative thereof, is inside or outside an operate area defined by the predetermined operation characteristic on an admittance plane, and detecting an earth fault on the three-phase electric line 30 when the neutral admittance, or the quantity indicative thereof, is determined to be inside said operate area. In other words, if the determined neutral admittance $\overline{Y}_o$, or the quantity indicative thereof, is within the operate area, an earth fault is detected to be on the three-phase electric line 30. On the other hand, if the determined neutral admittance $\overline{Y}_o$, or the quantity indicative thereof, is outside the operate area, for example, within the non-operate area, then no earth fault is detected to be on the three-phase electric line 30.

The predetermined operation characteristic to be used depends on the system in which the present disclosure is used. It may be selected by the operator of the system. Alternatively, it may be selected automatically, for example, adaptively according to predetermined criteria.

Figure 2:
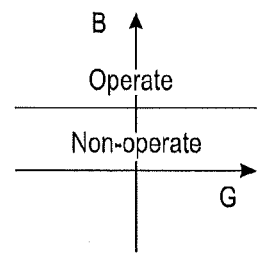
FIG. 2 is an example of an operation characteristic according to an exemplary embodiment of the present disclosure.

According to an exemplary embodiment, when the neutral admittance $\overline{Y}_o$ is determined by using only the neutral admittance(s) $\overline{Y}_o^n$ for the harmonic component(s) n, for example, $\overline{Y}_o = \overline{Y}_o^n$ or $\overline{Y}_o = \Sigma \overline{Y}_o^n$, then the operation characteristic shown in FIG. 2 may be used. The operation characteristic of FIG. 2 includes a threshold level for the susceptance B while there is no limit for the conductance G. The operate area is above the set threshold level for the susceptance B.

According to an exemplary embodiment, when the neutral admittance $\overline{Y}_o$ is determined by using a sum of fundamental frequency neutral admittance and a sum of neutral admittance(s) for the harmonic component(s) n, for example, $\overline{Y}_o = \overline{Y}_o^1 + \Sigma \overline{Y}_o^n$, in the case of an unearthed network, the operation characteristic of FIG. 2 may be used.

Figure 3:
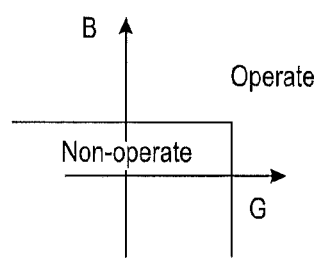
FIG. 3 is an example of an operation characteristic according to an exemplary embodiment of the present disclosure.
Figure 4:
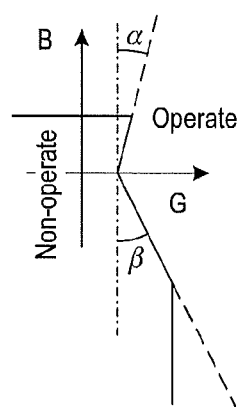
FIG. 4 is an example of an operation characteristic according to an exemplary embodiment of the present disclosure.

According to an exemplary embodiment, in a compensated network, when the neutral admittance $\overline{Y}_o$ is determined by using a sum of fundamental frequency neutral admittance and a sum of neutral admittance(s) for the harmonic component(s) n, for example, $\overline{Y}_o = \overline{Y}_o^1 + \Sigma \overline{Y}_o^n$, the operation characteristic of FIG. 3 or FIG. 4 may be used. The operation characteristic of FIG. 3 includes a threshold level for both the susceptance B and the conductance G. In the operation characteristic of FIG. 4, the conductance G has two threshold levels and also two slopes defined by angles α and β. The higher threshold level for the conductance G may be determined, for example, based on conductance of a parallel resistor of a compensation coil and the conductance representing the losses of the background network. The lower threshold level for the conductance G may be based on, for example, the minimum measurable conductance of an IED (Intelligent Electronic Device). The slopes defined by the angles α and β are used to maximize the operate area when the measured susceptance has a low value and then to increase the non-operate area when a higher amplitude susceptance is measured. Such a characteristic provides an optimal compromise between sensitivity and security of the protection. The set threshold level for the susceptance B may be based on the minimum measurable susceptance of the IED. In case there are distributed coils located on the electric line 30, then the setting may be set based on the maximum possible overcompensation situation, which occurs when the electric line 30 has its minimum configuration and the distributed coils are connected. It should be noted that the operation characteristics shown in FIGS. 2, 3 and 4 are only examples of possible operation characteristics. Other kind of operation characteristics could be used instead.

An apparatus according to any one of the above exemplary embodiments, or a combination thereof, may be implemented as a single unit or as two or more units that are configured to implement the functionality of the various embodiments. Here the term 'unit' refers generally to a physical or logical entity, such as a physical device or a part thereof or a software routine. One or more of these units may reside in the protective relay unit 40, for example.

An apparatus according to any one of the above exemplary embodiments may be implemented by means of a processor of a computer and/or corresponding digital signal processing equipment executing suitable software, for example. Such a computer or digital signal processing equipment can include at least a working non-transitory computer-readable memory (RAM) providing storage area for arithmetical operations and a central processing unit (CPU), such as a general-purpose digital signal processor, as well as a non-transitory memory (e.g., a ROM, hard disk drive, etc.) on which the executable software program and/or computer-readable instructions are recorded. The CPU may include a set of registers, an arithmetic logic unit, and a control unit. The control unit is controlled by a sequence of program instructions transferred to the CPU from the RAM. The control unit may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The computer may also have an operating system which may provide system services to a computer program written with the program instructions. The computer or other apparatus implementing the features of the present disclosure further may also include suitable input means (e.g., a keypad, a touch pad, input circuitry, or any other type of input device, etc.) for receiving, for example, measurement and/or control data. The input means thus enable, for example, the monitoring of current and voltage quantities, and output means (e.g., and audio and/or video output device, a control unit, etc.) for outputting, for example, fault alarms and/or control data, for example, for controlling protection equipment such as switches, disconnectors and circuit-breakers. It is also possible to use a specific integrated circuit or circuits, and/or discrete components and devices for implementing the functionality according to any one of the exemplary embodiments described above.

The present disclosure can be implemented in existing system elements, such as various protective relays or similar devices, or by using separate dedicated elements or devices in a centralized or distributed manner. Protective devices for electric systems, such as protective relays, can include processors and memory that can be utilized in the functions according to the exemplary embodiments of the present disclosure. Thus, all modifications and configurations required for implementing an embodiment of the disclosure, for example, in existing protective devices may be performed as software routines, which may be implemented as added or updated software routines. If the functionality of the present disclosure is implemented by a processor of a computing device executing software, such software can be provided as a computer program product including computer program code which, when run on a computer, causes the computer or corresponding arrangement to perform the functionality according to the present disclosure as described above. Such a computer program code may be stored or generally embodied on a non-transitory computer readable medium, such as suitable memory means, e.g. a flash memory or a disc memory from which it is loadable to the unit or units executing the program code. In addition, such a computer program code implementing exemplary embodiments of the present disclosure may be loaded to the unit or units executing the computer program code via a suitable data network, for example, and it may replace or update a possibly existing program code.

It will be obvious to a person skilled in the art that, as the technology advances, the inventive concept may be implemented in various ways. The disclosure and its embodiments are not limited to the examples described above but may vary within the scope of the claims.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for detecting an earth fault on a three-phase electric line of an electric network, the method comprising:
   monitoring a residual current on the three-phase electric line and a residual voltage in the electric network;
   detecting an earth fault in the electric network;
   determining a neutral admittance, or a quantity indicative thereof, on the basis of the residual current and the residual voltage;
   comparing the determined neutral admittance, or the quantity indicative thereof, to a predetermined operation characteristic to detect an earth fault on the three-phase electric line; and
   determining one or more harmonic components of the residual current and one or more harmonic components of the residual voltage, the harmonic components having frequencies n*fn such that n≥2 and fn is a fundamental frequency;
   wherein the determining of the neutral admittance, or the quantity indicative thereof, is performed using at least one of the determined one or more harmonic components of the residual current and the at least one of the determined one or more harmonic components of the residual voltage,
   wherein the method comprises selecting, according to one or more predetermined criteria, the at least one of the determined one or more harmonic components of the residual current and the at least one of the determined one or more harmonic components of the residual voltage used for the determining of the neutral admittance or the quantity indicative thereof, wherein:
   the one or more predetermined criteria include a minimum value for the harmonic component of the residual current and the harmonic component of the residual voltage, or
   the one or more predetermined criteria include at least one of a stability requirement for the harmonic component of the residual current, a stability requirement of the harmonic component of the residual voltage, and a ratio between the harmonic component of the residual current and the harmonic component of the residual voltage.

2. The method of claim 1, wherein the comparing of the determined neutral admittance, or the quantity indicative thereof, to a predetermined operation characteristic to detect an earth fault on the three-phase electric line comprises:
   determining whether the neutral admittance, or the quantity indicative thereof, is inside or outside an operate area defined by the predetermined operation characteristic on an admittance plane; and
   detecting an earth fault on the three-phase electric line when the neutral admittance, or the quantity indicative thereof, is determined to be inside the operate area.

3. The method of claim 1, wherein, when one harmonic component of the residual current and one harmonic component of the residual voltage are selected, the neutral admittance is determined to be equal to a neutral admittance for harmonic component n obtained from the selected harmonic component of the residual current and the selected harmonic component of the residual voltage.

4. The method of claim 1, wherein, when more than one harmonic component of the residual current and more than one harmonic component of the residual voltage are selected, the neutral admittance is determined to be equal to a sum of individual neutral admittances for harmonic components n obtained from the selected harmonic components of the residual current and the selected harmonic components of the residual voltage.

5. The method of claim 1, wherein, when one or more harmonic components of the residual current and harmonic components of the residual voltage are selected, the neutral admittance is determined to be equal to a sum of a fundamental frequency neutral admittance and a sum of at least one neutral admittance for at least one harmonic component n obtained from the selected one or more harmonic components of the residual current and harmonic components of the residual voltage.

6. A non-transitory computer-readable recording medium having a computer program recorded thereon that causes a processor of a computer processing device to carry out operations for detecting an earth fault on a three-phase electric line of an electric network, the operations comprising:
   monitoring a residual current on the three-phase electric line and a residual voltage in the electric network;
   detecting an earth fault in the electric network;
   determining a neutral admittance, or a quantity indicative thereof, on the basis of the residual current and the residual voltage; and
   comparing the determined neutral admittance, or the quantity indicative thereof, to a predetermined operation characteristic to detect an earth fault on the three-phase electric line;
   determining one or more harmonic components of the residual current and one or more harmonic components of the residual voltage, the harmonic components having frequencies n*fn such that n≥2 and fn is a fundamental frequency;
   wherein the determining of the neutral admittance, or the quantity indicative thereof, is performed using at least one of the determined one or more harmonic components of the residual current and the at least one of the determined one or more harmonic components of the residual voltage,
   wherein the operations comprise selecting, according to one or more predetermined criteria, the at least one of the determined one or more harmonic components of the residual current and the at least one of the determined one or more harmonic components of the residual voltage used for the determining of the neutral admittance or the quantity indicative thereof, wherein:
   the one or more predetermined criteria include a minimum value for the harmonic component of the residual current and the harmonic component of the residual voltage, or
   the one or more predetermined criteria include at least one of a stability requirement for the harmonic component of the residual current, a stability requirement of the harmonic component of the residual voltage, and a ratio between the harmonic component of the residual current and the harmonic component of the residual voltage.

7. An apparatus for detecting an earth fault on a three-phase electric line of an electric network, the apparatus comprising:
   means for monitoring a residual current on the three-phase electric line and a residual voltage in the electric network;
   means for detecting an earth fault in the electric network;
   means for determining a neutral admittance, or a quantity indicative thereof, on the basis of the residual current and the residual voltage;
   means for comparing the determined neutral admittance, or the quantity indicative thereof, to a predetermined operation characteristic to detect an earth fault on the three-phase electric line; and
   means for determining one or more harmonic components of the residual current and one or more harmonic components of the residual voltage, the harmonic components having frequencies n*fn such that n≥2 and fn is a fundamental frequency,
   wherein the means for determining a neutral admittance, or a quantity indicative thereof, are configured to use at least one of the determined one or more harmonic components of the residual current and at least one of the determined one or more harmonic components of the residual voltage for the determining of the neutral admittance or the quantity indicative thereof,
   wherein the apparatus comprises means for selecting, according to one or more predetermined criteria, the at least one of the determined one or more harmonic components of the residual current and the at least one of the determined one or more harmonic components of the residual voltage used for the determining of the neutral admittance or the quantity indicative thereof, wherein:
   the one or more predetermined criteria include a minimum value for the harmonic component of the residual current and the harmonic component of the residual voltage, or
   the one or more predetermined criteria include at least one of a stability requirement for the harmonic component of the residual current, a stability requirement of the harmonic component of the residual voltage, and a ratio between the harmonic component of the residual current and the harmonic component of the residual voltage.

8. The apparatus of claim 7, wherein the means for comparing the determined neutral admittance, or the quantity indicative thereof, to a predetermined operation characteristic to detect an earth fault on the three-phase electric line comprise:
   means for determining whether the neutral admittance, or the quantity indicative thereof, is inside or outside an operate area defined by the predetermined operation characteristic on an admittance plane; and
   means for detecting an earth fault on the three-phase electric line when the neutral admittance, or the quantity indicative thereof, is determined to be inside the operate area.

9. The apparatus of claim 7, wherein, when one harmonic component of the residual current and one harmonic component of the residual voltage are selected by the means for selecting, the means for determining a neutral admittance are configured to determine the neutral admittance to be equal to a neutral admittance for harmonic component n obtained from the selected harmonic component of the residual current and the selected harmonic component of the residual voltage.

10. The apparatus of claim 7, wherein, when more than one harmonic component of the residual current and more than one harmonic component of the residual voltage are selected, the means for determining a neutral admittance are configured to determine the neutral admittance to be equal to a sum of individual neutral admittances for harmonic components n obtained from the selected harmonic components of the residual current and the selected harmonic components of the residual voltage.

11. The apparatus of claim 7, wherein, when one or more harmonic components of the residual current and harmonic components of the residual voltage are selected, the means for determining the neutral admittance are configured to determine the neutral admittance to be equal to a sum of a fundamental frequency neutral admittance and a sum of at least one neutral admittance for at least one harmonic component n obtained from the selected one or more harmonic components of the residual current and harmonic components of the residual voltage.

12. The apparatus of claim 7, comprising:
   a protective relay.

13. An apparatus for detecting an earth fault on a three-phase electric line of an electric network, the apparatus comprising:
   a processor; and
   a memory storing instructions that, when executed by the processor, cause the apparatus to:
   monitor a residual current on the three-phase electric line and a residual voltage in the electric network;

determine one or more harmonic components of the residual current and one or more harmonic components of the residual voltage, the harmonic components having frequencies n*fn such that n≥2 and fn is a fundamental frequency;

detect an earth fault in the electric network;

determine a neutral admittance, or a quantity indicative thereof, on the basis of the residual current and the residual voltage by using at least one of the determined one or more harmonic components of the residual current and at least one of the determined one or more harmonic components of the residual voltage;

compare the determined neutral admittance, or the quantity indicative thereof, to a predetermined operation characteristic to detect an earth fault on the three-phase electric line; and select, according to one or more predetermined criteria, the at least one of the determined one or more harmonic components of the residual current and the at least one of the determined one or more harmonic components of the residual voltage used for the determining of the neutral admittance or the quantity indicative thereof, wherein:

the one or more predetermined criteria include a minimum value for the harmonic component of the residual current and the harmonic component of the residual voltage, or the one or more predetermined criteria include at least one of a stability requirement for the harmonic component of the residual current, a stability requirement of the harmonic component of the residual voltage, and a ratio between the harmonic component of the residual current and the harmonic component of the residual voltage.

* * * * *